United States Patent [19]
Nicot

[11] Patent Number: 6,131,472
[45] Date of Patent: Oct. 17, 2000

[54] DEVICE THAT MEASURES TORQUE OF A ROTATING SHAFT

[75] Inventor: Christophe Nicot, Epagny, France

[73] Assignee: The Torrington Company, Torrington, Conn.

[21] Appl. No.: 08/926,257

[22] Filed: Sep. 5, 1997

[30] Foreign Application Priority Data

Sep. 6, 1996 [FR] France .................................. 96 10886

[51] Int. Cl.[7] ...................................................... G01L 3/00
[52] U.S. Cl. ............................................................ 73/862.08
[58] Field of Search ...................... 73/862.321, 862.325, 73/862.332, 862.08, 862.333, 862.335, 862.193

[56] References Cited

U.S. PATENT DOCUMENTS

| | | | |
|---|---|---|---|
| 3,191,434 | 6/1965 | Brunner et al. | 73/862.331 |
| 4,448,275 | 5/1984 | Kitagawa et al. | 73/862.331 |
| 4,522,278 | 6/1985 | Kitagawa et al. | 73/862.321 |
| 5,490,431 | 2/1996 | O'Mahony et al. | 73/862.325 |
| 5,501,110 | 3/1996 | Peilloud | 73/862.321 |
| 5,646,355 | 7/1997 | Fukushima et al. | 73/862.195 |
| 5,850,045 | 12/1998 | Harada et al. | 73/862.333 |

FOREIGN PATENT DOCUMENTS 2 689 633  10/1993  France .

*Primary Examiner*—Benjamin R. Fuller
*Assistant Examiner*—Jewel V. Thompson
*Attorney, Agent, or Firm*—John C. Bigler

[57] ABSTRACT

Two members for generating a magnetic field are fixed symmetrically with respect to a shaft in a first plane perpendicular to the shaft, and two members for detecting the magnetic field are fixed, symmetrically with respect to the shaft, in a second plane which is parallel and axially offset with respect to the first plane. A routing member for routing the magnetic field lines, made of ferromagnetic material, rotationally integral with the shaft and surrounding the shaft, is provided at the periphery of the members for detecting and for generating a magnetic field, on at least that portion of the shaft which lies between the first and second plane.

3 Claims, 1 Drawing Sheet

DEVICE THAT MEASURES TORQUE OF A ROTATING SHAFT

BACKGROUND OF THE INVENTION

This invention relates generally to a device for measuring torque on a shaft that can turn and, more particularly, to a device for measuring torque making it possible to reduce the inaccuracies which are due to defects in coaxiality of the various constituent parts.

Publication FR 2692986 describes a device for measuring torque on a shaft that can turn, this device comprising two members for generating a magnetic field, these being rotationally integral with a first support and situated in a plane of a right section through a shaft, and two devices for detecting the magnetic field, these being rotationally integral with a second support and immobilized in a plane of another right section through said shaft. The application of a torque to the turning shaft results in a relative angular displacement about the shaft of the detecting devices relative to the devices for generating the magnetic field. This variation is linear with respect to the displacement. In order to maintain this linearity it is necessary to ensure that the gradient of the magnetic field produced by the generating members is as constant as possible in the air gap separating the generating members from the detectors.

In the situation described in document FR 2692986, the field lines of the generating members close through the supports, which are made of ferromagnetic material. To this end, the supports are extended radially beyond the magnets so as to be able to route the field lines situated outside an imaginary cylinder passing through the magnets and coaxial with the shaft. The protective casing which contains the whole may be made of any material, ferromagnetic or otherwise. However, when the radial space is limited as is, for example, the case when the device is intended to be built into the steering gear of a vehicle, or even into the steering column of the vehicle, there is no longer enough space between the magnets and the cover for the magnetic field to be able to close inside the protective housing. Now, it is not acceptable for the magnetic field to close outside the protective housing because in such a case the field and therefore the accuracy of the measurement would depend on the environment outside the housing.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

One approach to try to solve such problems might be to use a housing made of ferromagnetic material, the field thus being closed within the housing at the periphery of the magnets. However, given that the shaft and therefore the magnets attached to it turn with respect to the housing, the slightest dimensional lack of uniformity of this housing or the slightest defect in coaxiality resulting from the way the shaft is mounted in the housing will lead to a variation in the magnetic field, and therefore in the measurement, which variation will not be due to a torque. Thus, a non-zero value for torque will be measured as soon as the shaft rotates, and this will be the case even if no torque is applied.

SUMMARY OF THE INVENTION

In one aspect of the invention, a suitable alternative is accomplished by providing a device for measuring torque on a shaft that can turn, comprising two members for generating a magnetic field, which are fixed symmetrically with respect to the shaft in a first plane perpendicular to this same shaft and two members for detecting the magnetic field which are fixed, symmetrically with respect to the shaft, in a second plane which is parallel and axially offset with respect to the first plane. A member for routing the magnetic field lines, made of ferromagnetic material, rotationally integral with the shaft and surrounding the shaft, is provided at the periphery of the detecting members and the generating members, on at least that portion of the shaft which lies between the first and second planes.

The foregoing and other aspects will become apparent from the following detailed description of the invention when considered in conjunction with the accompanying drawing figures.

BRIEF DESCRIPTION OF THE DRAWING FIGURES

FIG. 1 is a view in longitudinal half-section of a device illustrating an embodiment of the present invention; and FIG. 2 is a sectional view taken along the line 2—2 of FIG. 1.

DETAILED DESCRIPTION

Figure 1:
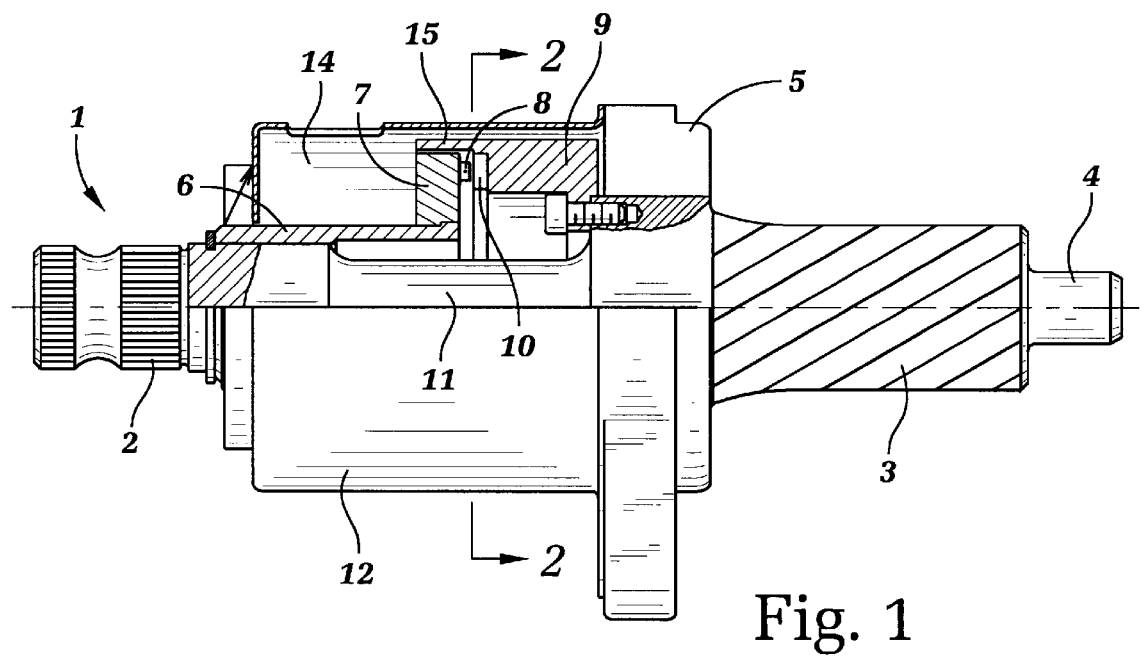
Figure 2:
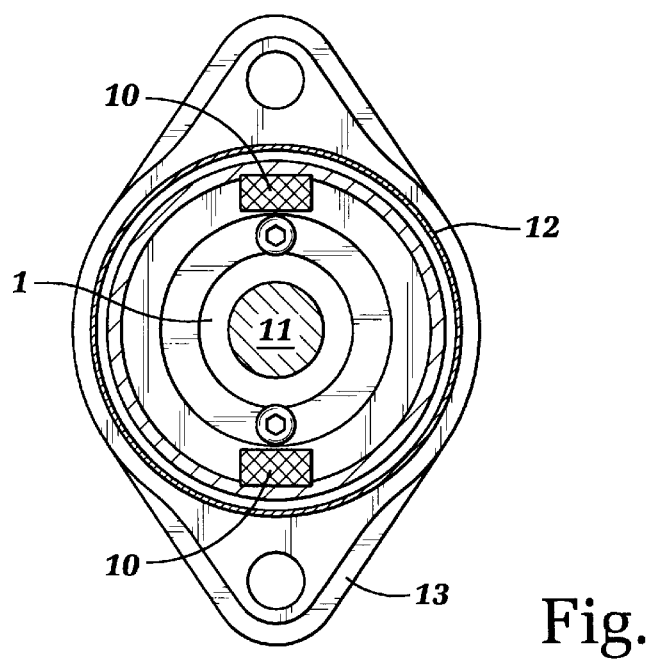

Referring now to the drawings, shaft 1 represented in FIGS. 1 and 2 is, according to one embodiment of the invention, a shaft which within a steering system provides the link between a steering rack and a transmission shaft of a steering column (these not being represented). For this purpose, shaft 1 at its left-hand end has splines 2 allowing it to be connected to the transmission shaft of the steering column. The right-hand end has rack pinion 3 which is extended on its right-hand side by a smaller section shaft having bearing surface 4 machined to form an inner race of a first rolling-contact bearing, of the needle bearing type. Shaft 1 includes, situated immediately to the left of rack pinion 3, second rolling-contact bearing 5.

FIG. 1 illustrates shaft 1 equipped with a torque measurement device the operation of which is described in publication FR 2692986. Shaft 1 has a first substantially tubular race 6 which is extended radially by a first annular support 7 carrying two members 8 for detecting a magnetic field which are arranged symmetrically with respect to the axis of shaft 1 in a first plane perpendicular to shaft 1, one of detector members 8 not being visible in the half-section of FIG. 1. Shaft 1 also carries a second, substantially tubular, support 9 pointing toward first support 7. Second support 9 is represented in the figures, fixed to the shoulder of the inner race of second bearing 5, which makes it possible to make the device more compact, but it is quite clear that some other type of mounting would not be departing from the scope of the present invention. Second support 9 carries two members 10 for generating a magnetic field, these being arranged symmetrically with respect to the axis of shaft 1, in a second plane perpendicular to shaft 1 and facing detector members 8, one of generator members 10 not being visible in the half-section of FIG. 1.

In order axially to localize the torsional deformation of shaft 1 between first support 7 and second support 9, shaft 1 has a reduction in diameter between supports 7 and 9.

Cap 12 covers the torque measurement device as a whole and is fixed to race 13 of bearing 5. It incorporates passage 14 which can turn. In order for the magnetic field generated by generator members 10 to be capable of closing on a part which is rotationally integral with shaft 1, second support 9 is extended axially in the direction of first support 7 in the form of radial extension 15 covering at least the air gap between generating members 10 and detector members 8. In FIG. 1, radial extension 15 also surrounds annular part 7. Quite obviously, first support 7, second support 9 and radial extension 15 are made of ferromagnetic material. Radial extension 15 may be of a single piece with second support 9 or, by contrast, may consist of a cylindrical part attached to second support 9 or to first support 7. This arrangement makes it possible to optimize the measurement accuracy of the device because the magnetic field is routed by components which are rotationally integral with shaft 1. Thus, a defect in the geometry of these components has no effect on the constancy of the magnetic field.

In contrast to the configurqtion of the present invention, when the magnetic field is closed through the protective housing, the slightest dimensional lack of uniformity of this housing results, on account of its relative movement with respect to the shaft and therefore with respect to the generating members, in a variation in the measurement. Likewise the slightest defect in coaxiality associated with mounting tolerances between the housing and the shaft would lead to a variation in the measurement. The device according to the present invention therefore makes it possible to obtain good measurement accuracy while at the same time maintaining production and assembly tolerances for the components which are broad enough to be compatible with mass production.

Cap 12, which no longer has any magnetic function, can be made of a material which is not ferromagnetic. The generating members and the detecting members are carried respectively by a first support and by a second support which are fixed to the shaft, the routing member consisting of an axial extension of one of the supports toward the other. The routing member consists of a tubular component fixed to one of the supports. The routing member arranged at the periphery of the air gap separating the magnetic field detectors and the generating members makes it possible to confine the magnetic field through the components which are rotationally integral about the shaft. This makes it possible to optimize the measurement accuracy of the device because the magnetic field no longer depends on the angular position of the shaft. Thus, a defect in geometry of these components has no effect on the constancy of the magnetic field. The device according to the present invention thus makes it possible to obtain good measurement accuracy while at the same time maintaining production and assembly tolerances for the components which are broad enough to be compatible with mass production.

Of course the invention is not in any way limited to the embodiment described and illustrated which was given merely by way of example. In particular, the device is applicable to any type of shaft in which it is necessary to fit a torque measurement device.

Having described the invention, what is claimed is:

1. A device for measuring torque on a shaft that can turn, comprising:

two generating members for generating a magnetic field which are fixed symmetrically with respect to the shaft in a first plane perpendicular to the shaft;

two detecting members for detecting the magnetic field which are fixed, symmetrically with respect to the shaft, in a second plane which is parallel and axially offset with respect to the first plane; and a routing member for routing the magnetic field lines, made of ferromagnetic material, rotationally integral with the shaft and surrounding the shaft, at the periphery of the detecting members and the generating members, on at least that portion of the shaft which lies between the first and second planes, such that the detecting members are shielded from stray magnetic fields.

2. A device for measuring torque on a shaft that can turn, comprising:

two generating members for generating a magnetic field which are fixed symmetrically with respect to the shaft in a first plane perpendicular to the shaft;

two detecting members for detecting the magnetic field which are fixed, symmetrically with respect to the shaft, in a second plane which is parallel and axially offset with respect to the first plane; and a routing member for routing the magnetic field lines, made of ferromagnetic material, rotationally integral with the shaft and surrounding the shaft, at the periphery of the detecting members and the generating members, on at least that portion of the shaft which lies between the first and second planes;

wherein the generating members and the detecting members are carried respectively by a first support and by a second support which are fixed to the shaft, the routing member consisting of an axial extension of one of the supports toward the other.

3. A device for measuring torque according to claim 2, wherein the axial extension consists of a tubular component fixed to one of the first and second supports.

* * * * *